United States Patent [19]

Vargo

[11] 4,421,239
[45] Dec. 20, 1983

[54] KEY FOR USE WITH KNOCK-DOWN SHELVING UNITS

[75] Inventor: William R. Vargo, Lithonia, Ga.

[73] Assignee: Husky Systems of Georgia, Inc., Lithonia, Ga.

[21] Appl. No.: 332,147

[22] Filed: Dec. 18, 1981

Related U.S. Application Data

[63] Continuation-in-part of Ser. No. 67,567, Aug. 17, 1979, abandoned.

[51] Int. Cl.³ .............................................. A47F 5/00
[52] U.S. Cl. .................................... 211/187; 108/107; 211/192; 248/243; 403/219; 403/318; 403/405
[58] Field of Search ............... 211/192, 187, 191, 208; 248/243; 108/107; 403/318, 405, 219

[56] References Cited

U.S. PATENT DOCUMENTS

| 1,952,111 | 3/1934 | Bales | 248/243 |
| 1,974,050 | 9/1934 | Keil | 248/243 |
| 2,760,650 | 8/1956 | Franks | 211/187 |
| 2,778,505 | 1/1957 | Levitt et al. | 248/243 |
| 2,950,826 | 8/1960 | Degener | 211/191 |
| 3,490,604 | 1/1970 | Klein | 211/191 |
| 3,637,086 | 1/1972 | Klein | 5/296 |
| 3,659,884 | 5/1972 | Ohlin | 211/191 |
| 4,064,996 | 12/1977 | Shillum | 211/191 |

FOREIGN PATENT DOCUMENTS 1847778  8/1963  Sweden .............................. 211/187

Primary Examiner—Ramon S. Britts
Assistant Examiner—Robert W. Gibson, Jr.
Attorney, Agent, or Firm—Body, Vickers & Daniels

[57] ABSTRACT

A key for use with knock-down shelving units which can be fixedly assembled with the vertical posts of the unit before they're hoisted into vertical position and enables easy assembly of the horizontal beams therewith. The key includes a vertical shank with a pair of hooks projecting outwardly from the shank intermediate its ends and then upwardly in the form of a hook projection. The lower side of each hook adjacent the shank is provided with a downwardly opening notch which will wedgingly lock with the walls of the vertical post at the lower end of the slots therein. The lower side of each hook slopes downwardly from the shank to assist in assembly of the key with the vertical posts.

6 Claims, 8 Drawing Figures

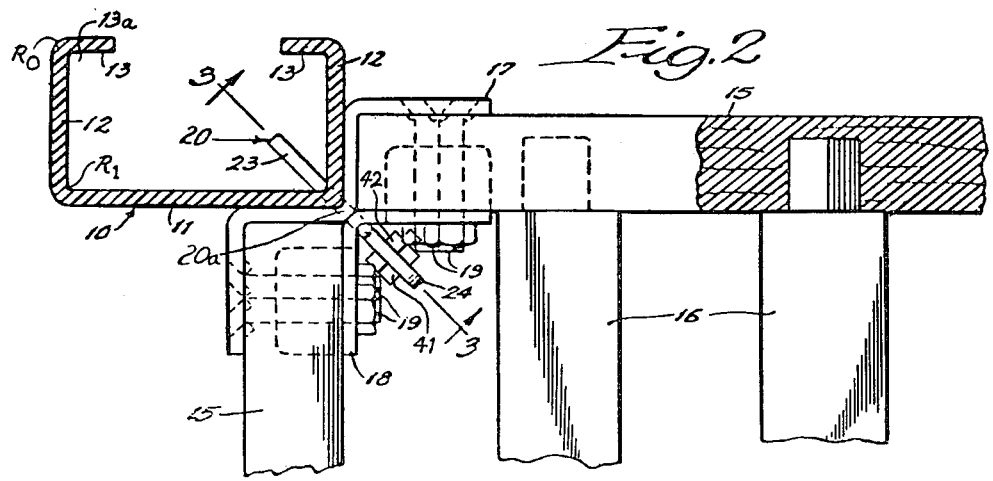
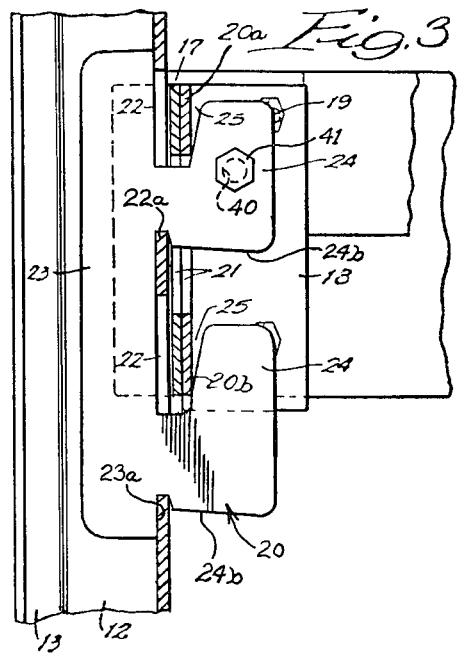
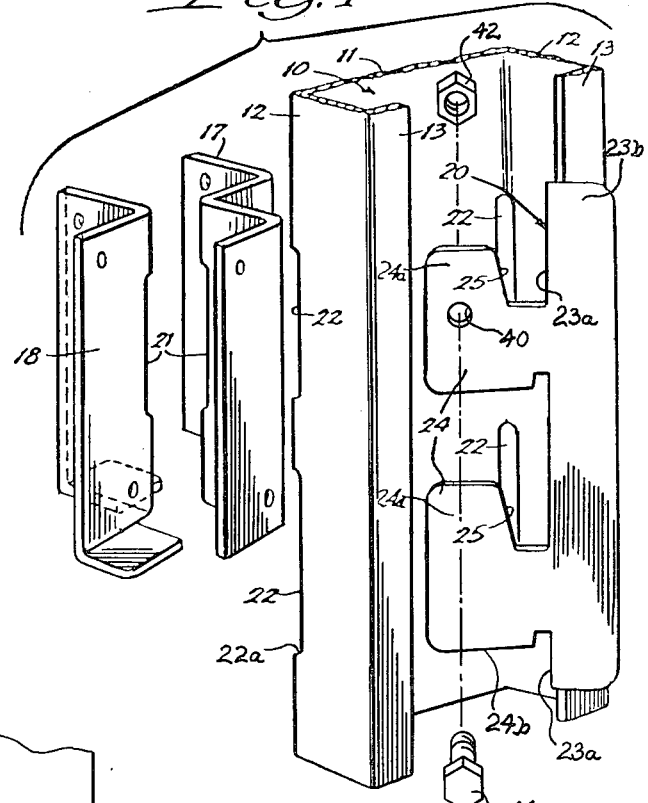
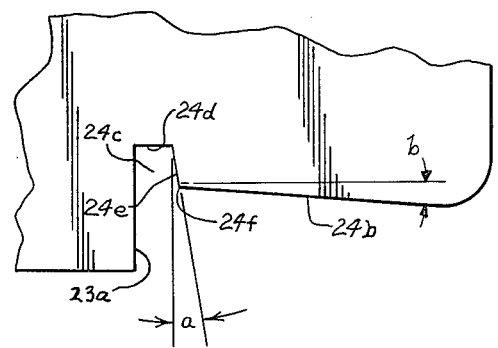

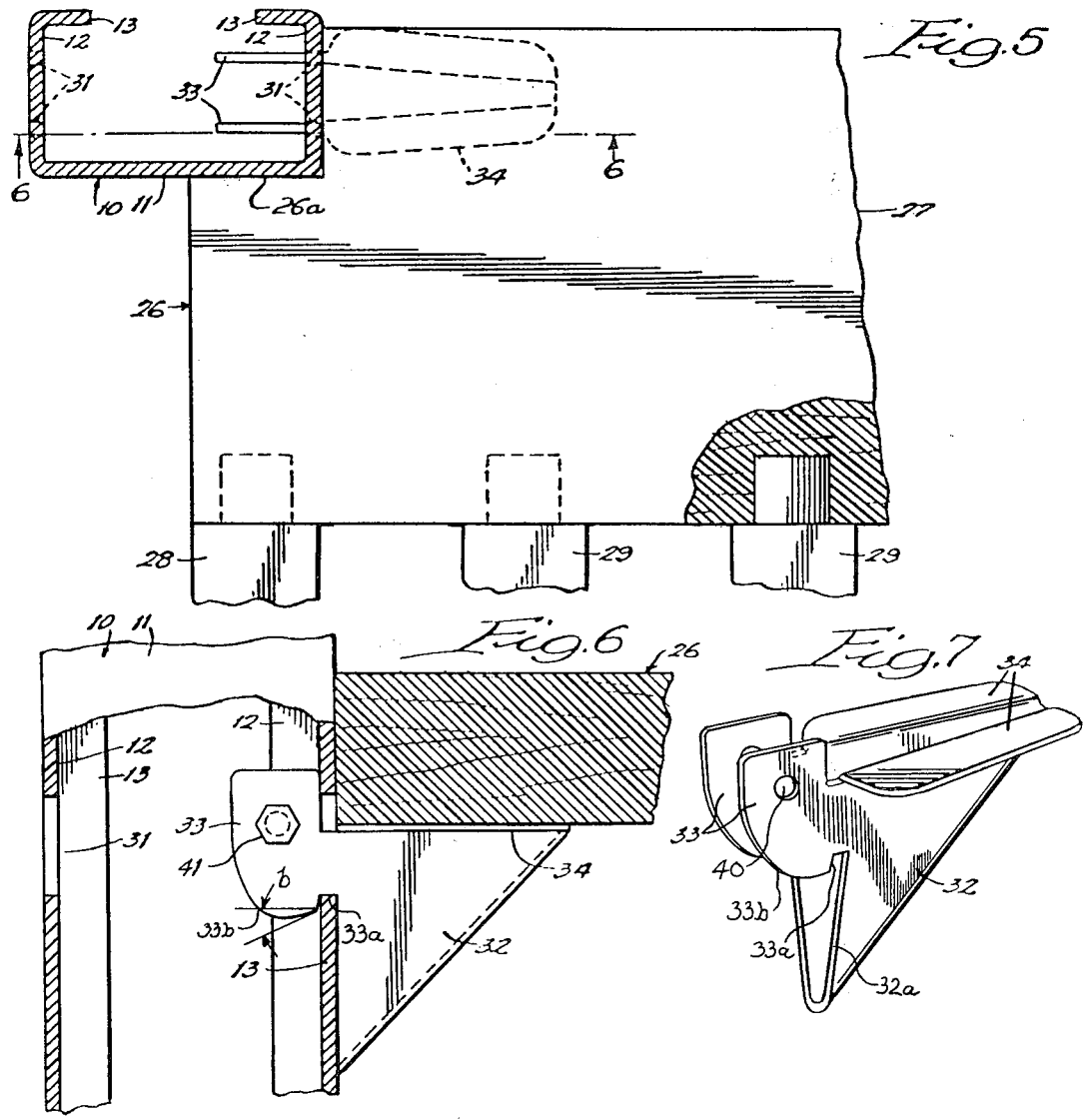

KEY FOR USE WITH KNOCK-DOWN SHELVING UNITS

This application is a continuation-in-part of my copending application Ser. No. 067,567 filed Aug. 17, 1979 which will be abandoned in favor of this application.

BACKGROUND OF THE INVENTION

This invention pertains to the art of knock-down shelving and, more particularly, to an improvement in the key used for locking the vertical posts and horizontal beams in assembled relationship.

The invention in particular is an improvement on the key described and illustrated in U.S. Pat. Nos. 2,760,650 and 3,490,604 and will be described with particular reference to these patents and the disclosures thereof are incorporated herein by reference. In those patents a shelving unit is described including vertical posts having a hollow rectangular cross-sectional shape with the walls having a plurality of vertically spaced, vertically extending slots. The horizontal beams are provided with plates which abut against the outer surfaces of the vertical posts and have similarly dimensioned vertically extending slots. A key is then positioned inside of the vertical post which key has hook portions projecting through aligned slots in the posts and the ends of the horizontal beams. The upper edge of each slot in the ends of the horizontal beams is then lowered so as to be within the opening of the hook portions and thus supported and locked into assembled relationship with the vertical posts.

In U.S. Pat. No. 2,760,650 the vertical height of the hook portions is slightly less than the vertical height of the vertical slots and where more than one hook portion is provided, they are spaced apart the same distance as the vertical slots. Thus, the key may be assembled with the vertical post by a simple transverse movement to have the hook portions extend through the slots. Until the horizontal beams are assembled therewith, the key is free to fall out of the slots and thus to the ground.

To overcome this problem, U.S. Pat. No. 3,490,604 proposed that the key have two hook portions with the upper hook portion having a vertical length greater than the vertical height of the slots. The horizontal beam had to be manually held in position against the posts with the vertical slots aligned. Then the key was assembled with the two by first orienting the key at an angle so that the longer hook portion would pass through the vertical slots. Then the key was rotated to bring the lower hook portion through the immediately below slot. Then the horizontal beam was lowered so as to fit in the opening part of the hook portions.

In this improvement, the key could not be assembled with the vertical post until it was in vertical position and the horizontal beam in place. This is a particularly difficult operation particularly when the horizontal beam to be installed is a substantial distance above the ground. For example, the installer had to: (1) climb the vertical post; (2) stand on the beam below; (3) hold onto the post with one hand to hold himself in position; (4) use his other hand to bring the horizontal beam into aligned relationship with the vertical post; (5) locate the key (in his pocket); (6) position the upper hook portion in the aligned slots; (7) rotate the key so that the lower hook portion goes through the next lower slot; and, (8) finally move the horizontal beam downwardly into locking relationship with the hook portions and the vertical post. Oftentimes two people are required to do this because the installer only has two hands. Because of the vertical height, there is a substantial danger of falling. Furthermore, only having two hands to simultaneously do all these operations and also hold oneself in position at the same time is quite difficult.

Furthermore, there is no way of locking permanently the horizontal beams in assembled relationship with the key and the vertical post to prevent disassembly should the horizontal beam be accidentally knocked upwardly, for example when a fork truck is loading goods onto one of the storage racks.

THE INVENTION

In accordance with the invention, a key for use in combination with vertical posts and horizontal beams of the general type described in said patents, U.S. Pat. Nos. 2,760,650 and 3,490,604, is provided wherein the lower side of at least one hook portion adjacent the shank is provided with a downwardly facing notch having a horizontal width preferably such as to wedgingly lock with the walls of the vertical posts at the lower end of the vertical slots in which the hook portion is positioned.

Further in accordance with the invention, the slot has a downwardly diverging configuration so that different wall thicknesses of vertical posts will readily lock with one size key.

Further in accordance with the invention, the upper hook portion of each key has a transverse opening therethrough spaced from the shank in combination with a retaining member inserted therethrough after the rack is assembled to permanently lock the rack in assembled relationship and prevent accidental disengagement of the key.

Further in accordance with the invention, the lower side of each hook portion has a surface which angles downwardly from the perpendicular with the shank axis so as to assist the key in being assembled with the vertical post.

OBJECTS

The principal object of the invention is the provision of a new and improved key for use with knock-down shelving units which has provision for self-locking in assembled relationship with the walls of the vertical posts of such units.

Another object of the invention is the provision of a new and improved key which is simple in construction, economical to manufacture, and easily installed in a knock-down shelving unit.

Another object of the invention is the provision of a new and improved key for use with knock-down shelving type units wherein the hook portions on the lower side have a downwardly facing notch which will wedgingly lock the key with the vertical post of the shelving unit.

Another object of the invention is the provision of a new and improved key for use with knock-down shelving units which can be fixedly assembled with the vertical posts while the vertical posts are still in a horizontal position.

Another object of the invention is the provision of a new and improved key for use with knock-down shelving units in combination with means for permanently locking the key and the vertical post and horizontal beam in assembled relationship.

Another object of the invention is the provision of a key of the general type described wherein the lower surface of the hook portion angles outwardly and downwardly from the shank whereby to assist in the assembly of the key with the vertical post.

DRAWINGS

The invention may take physical form in certain parts and arrangements of parts, a preferred embodiment of which will be described in detail in this specification and illustrated in the accompanying drawings which form a part hereof and wherein:

FIG. 2 is a partial enlarged section on the line 2—2 of FIG. 1;

FIG. 3 is a partial section on the line 3—3 of FIG. 2;

FIG. 3a is a detailed enlarged view of the notch formed in the lower surface of each hook portion;

FIG. 4 is a disassembled view of a corner showing the joint construction;

FIG. 5 is a partial section on the line 5—5 of FIG. 1 showing the mounting of an intermediate shelf;

FIG. 6 is a section on the line 6—6 of FIG. 5; and,

FIG. 7 is a perspective view of the intermediate shelf support.

PREFERRED EMBODIMENT

Figure 1:
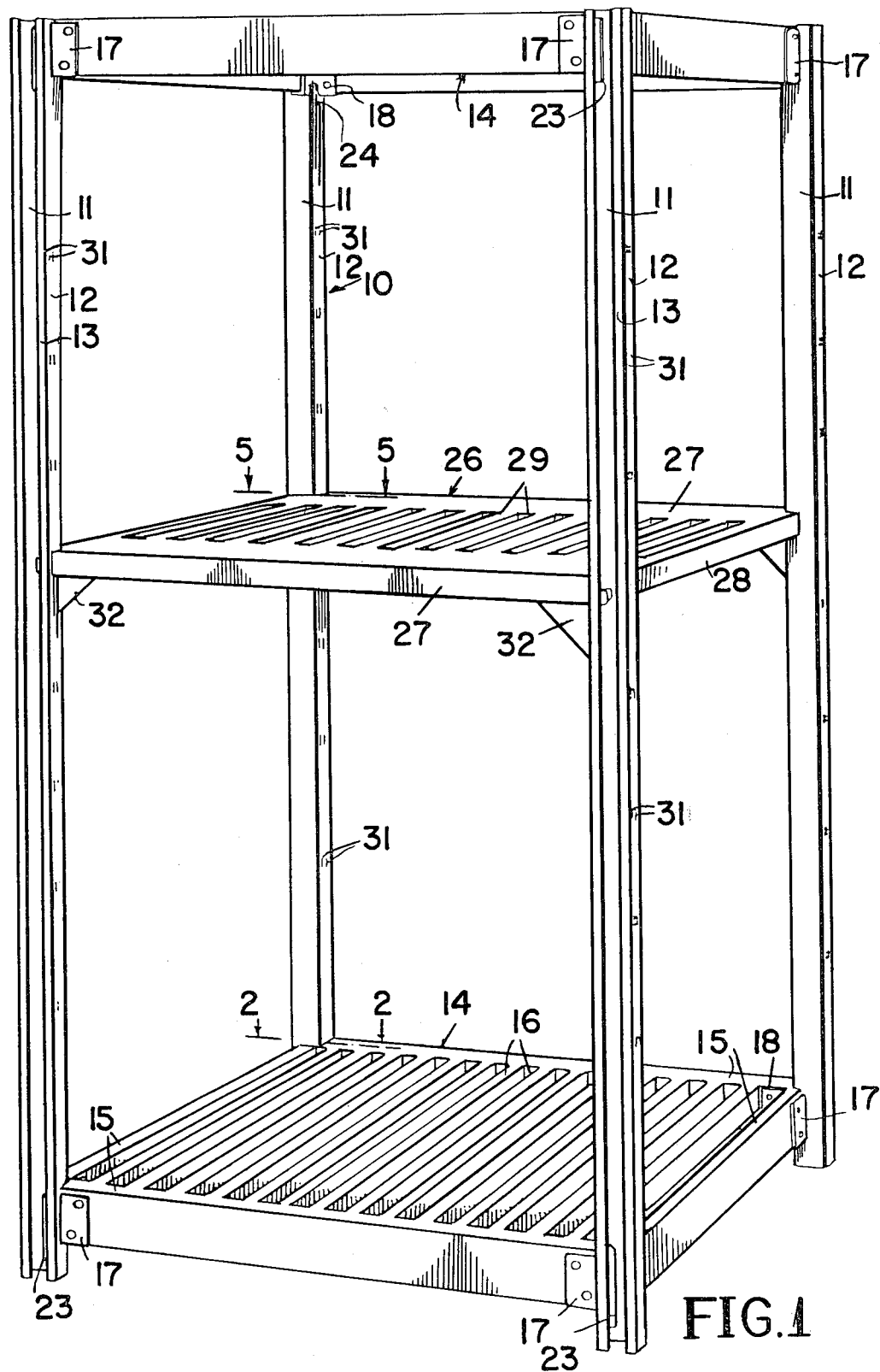
FIG. 1 is a perspective view of a complete shelf unit embodying the invention.

The complete unit, as best shown in FIG. 1, is formed by corner posts indicated generally at 10 which, as best seen in FIG. 2, are formed of sheet metal of a channel section to provide a flat face or web 11, flat ends 12 at right angles to the face 11 and inwardly turned flanges 13 at the edges of the ends 12. These ends, web and flanges are joined at corners 13a having an inner radius $R_i$ and an outer radius $R_o$. The corner posts 10 may be made of any desired length depending upon the height of the shelving unit desired and the number of intermediate shelves to be carried thereby. As shown in FIG. 1, only one intermediate shelf is present, although it will be understood that in a normal installation not only the top and bottom shelf units, but also a plurality of intermediate shelves, would be employed.

The corner posts 10 are connected at their upper and lower ends by upper and lower shelf units 14 which may be identical. Each of the shelf units 14 is formed by outer wooden side end members 15 meeting at right angles and joined at their corners by connecting members 17. The shelves are completed by spaced slats 16 secured between the side members to provide a supporting surface for articles to be stored.

As best seen in FIG. 2, the side and end members 15 are formed with square ends which terminate spaced from each other to overlie and abut against the face 11 and one end 12 of the adjacent corner posts. The end and side members are connected by a sheet metal connecting part including an outer strip 17 extending over the outer face of the side members and over the ends thereof to abut squarely against the corner post 10. The connecting part is completed by an inner angle strip 18 fitting in the internal angle between the adjacent side and end strips 15 and secured to the strips and to the outer connecting part 17 by bolts, or the like, shown at 19. The connecting parts 17 and 18 are formed intermediate their ends with registering openings or slots 21 at the apex of the angle so that the slots will register with the corner of a corner post when the parts are assembled. The slots 21 divide the connecting parts into an upper portion 20a and a lower portion 20b to provide a double wedging connection as described hereinafter.

To secure the parts together, the corner posts 10 are formed at the apex of the angle between the face 11 and the end surfaces 12 with vertically spaced slots 22. The uppermost openings 22 may register with the opening 21 in the connecting part when the parts are assembled and the lowermost opening may register with the lower edge of the connecting portion 20b, as best seen in FIG. 3.

A key indicated generally at 20 is provided formed with a flat elongated shank 23 to fit into the hollow corner post and with projecting hook portions 24 projecting outwardly from the shank intermediate its ends and then upward in the form of hook projections 24a. The hook portions 24 are of a length less than the length of the openings 21 and 22 and extend outwardly through the openings 21 and 22. The hook projections are formed with inner wedging surfaces 25 extending upwardly at an acute angle to the shank 23 to receive and hold the connecting portions 20a and 20b formed by the strips 17 and 18.

Importantly, in accordance with the invention, the lower side 24b of each hook portion 24 immediately adjacent to the vertical edge 23a of the shank 23 is provided with a downwardly facing notch 24c defined by a base 24d and a side wall 24e intersecting with the lower side 24b at a corner 24f. The depth of the notch may be as desired, preferably being at least equal to the maximum thickness of the wall 13 of the vertical corner post 10. As the walls of the vertical posts will have a nominal variation of from 0.090 inches to 0.125 inches, the depth of the notch should be approximately 0.125 inches.

Further, the wall 24e preferably diverges downwardly and outwardly from the wall 23a so that the notch is slightly wedge shaped. The angle a of divergence may be as desired but is preferably approximately 10°. It is to be noted that the minimum width of the slot 24c at the lower or open end should be as to fit over the rounded corners of the vertical posts taking into consideration the inner and outer radiuses of these corners. Thus, the horizontal width of the notch 24c should be such that when the hook portions are inserted through the vertical slots 22 until the vertical edge 23a engages the inner surface of the corner post, the key may then be forcefully moved downwardly to force the upper edge 22a of the vertical slot 22 into the notch with sufficient force and sufficient interference that the key will be locked in position on the corner post 10. It is to be noted that in some instances the key can be locked in this position by manual means but if this is not sufficient, a hammer or other heavy instrument impacted on the upper end 23b of the shank 23 will force this interference interlocking fit.

Further in accordance with the invention, the lower side 24b of each hook portion 24 has a surface which angles at an angle b downwardly from the perpendicular with the edge 23a to assist the key in being assembled into the slots 22 and once the hook portions 24 are positioned in the slots 22, will aid in its further insertion to bring the notches into alignment with the corners 13a of the corner post 10.

It will be appreciated that if the corner post is vertical, the notches may be of any width, within limits, greater than the wall thickness of post 10. In such situations, the key will not fall out of assembled relationship with the corner posts under the force of gravity. However, if the corner posts are horizontal, then the dimensions of the notch become important so as to wedgingly interlock with the vertical posts. The posts may then be moved into any position without the key becoming dissassembled therewith under the force of gravity.

To assemble the parts, the key is first inserted from the inside of the corner posts and in the upper and lower ends of the corner posts with the hook portions 24 projecting outwardly through the openings 22 and the hook projections 24a facing upwardly.

The key is then pressed downwardly either manually or with a hammer or other blunt, heavy instrument. This forces the upper edge of the openings 22 into the notch 24c and causes the corners of the notch to wedgingly lock with the walls of the post 10 adjacent the lower ends of the openings 22. With this arrangement, the post can be inverted, laid horizontally or rotated and the key will remain in assembled relationship.

The upper and lower shelf members may then be placed between the corner posts with the lower edges of the connecting portions 20b fitting into the lower hook 24 and with the upper hook extending through the openings 21 and receiving the connecting portions 20a. When the shelf units are pressed downwardly, they will be wedged inwardly toward the corner posts by the angular surfaces 25 to draw the connecting part 17 and the square ends of the side and end strips 15 tightly against the adjacent surfaces of the corner posts. The connecting parts and the corner posts are preferably relatively deep, on the order of several inches, so that the surfaces will press against each other and provide an extremely rigid and sturdy joint. At the same time, the complete assembly can be put together without the use of any tools except a hammer or equivalent and can easily be disassembled without the use of tools.

It is to be noted that the vertically spaced hook portions 24a and 24b engage the connecting portions 20a and 20b at points spaced longitudinally of the corner posts to provide a very rigid assembly which will not sway or rock easily and which has a very large load carrying capacity.

Further in accordance with the invention, the uppermost hook portion is provided with a transverse opening 40 (see FIG. 4) spaced from the edge 23a a distance at least equal to the thickness of the wall or post 10 plus the two brackets 17 and 18 in which opening a positive safety stop, for example, a split pin, rivet or, as shown, a threaded bolt 41 can be positioned and held in position by means of a nut 42. Once the key is installed and assembled with the post 10 and the horizontal beam, such bolt 41 can be installed. Such bolt as shown in the drawings has a length greater than the width of the slot 21, 22 of the plate 18 and post 12 respectively. It prevents the plate 18 from being dislodged if accidentally bumped by any external means such as a carelessly operated fork truck attempting to deposit goods on the shelves of the storage unit.

The intermediate shelves 26 are preferably notched at the corners as indicated at 26a to fit against the corner posts, as best seen in FIG. 5. To support the intermediate shelves in any one of a plurality of desired positions, each corner post is formed in its end surfaces with vertically spaced sets of slots 31. Each set of slots, as best seen in FIGS. 1 and 5, comprises a pair of side-by-side vertically elongated openings. The slots are adapted to receive supporting brackets of the type best shown in FIGS. 6 and 7 which are formed of sheet metal bent to provide a main U-section body 32 of triangular contour with the hook members 33 extending from the ends of the body sides. Preferably the edges of the body sides may be bent over, as shown at 34, to provide flat outwardly extending flanges upon which the shelves may rest.

In accordance with the invention, each hook member 33 has a notch 33a in its lower side 33b at the intersection of the edge 32a of the main body 32. The dimensioning of this notch 33a is described with reference to the notch 24c. Additionally, the lower edge 33b of the hook member 33 extends outwardly and downwardly from the edge 32a at an angle b other than perpendicular to assist the supporting bracket is being assembled with the vertical post 10.

To assemble the supports on the corner posts, a support may be turned upwardly with the flanges 34 flat against the end surface 12 of the corner post and the hook members 33 may be inserted through slots in the posts. The support may then be turned down to the position shown in FIGS. 5 and 6 in which its lower edge portion abuts against the end 12 of the corner post and the hook members 33 grip the internal surface of the corner post to prevent accidental removal of the support. Once the bracket has been positioned on the post 10, it can be forced downwardly, either manually or by a blunt, heavy instrument such as a hammer, to force the lower edge of the slot 31 into the notch 33a and thus lock the bracket and post together.

Thus, it will be seen that a key of unique design has been provided for use in conjunction with the knock-down shelving units which accomplishes all of the objective heretofore set forth and others, which enables one man to assemble the shelving unit even while high in the air, and, in particular, enables the key to be placed in position first, for example, when the vertical post is in a horizontal position, and then interlocked with the post with a gentle tap on one end with readily available tools. The advantage of being able to permanently lock the keys with vertical posts while working at convenient levels on the floor cannot be overstressed. Furthermore, the key once installed and with the safety stop in position assures that the shelving unit will not accidentally come apart.

For the purposes of convenience and for clarity in the claims, directional words, e.g., up, down, horizontal and/or vertical, are used with reference to the key and its intended shelving unit in their final assembled relationship, it being understood that they are intended to cover the key in any orientation.

The invention has been described with reference to preferred embodiments. Obviously modifications and alterations will occur to others upon a reading and understanding of this specification and it is my intention to include all such modifications and alterations insofar as they come within the scope of the appended claims.

Having thus described the invention, it is claimed:

1. In a key for use with a knock-down shelving unit which unit is comprised of: a hollow vertical post of sheet metal material of generally rectangular cross-section and having at least a pair of vertically spaced, vertically extending slots along its length and horizontal beams having end plates with similarly spaced and extending slots to be assembled with the post; said key including an elongated shank having an edge of a length greater than the length of one of said slots and adapted to abut against a wall of said post, said key additionally having an upwardly opening hook portion extending from said edge and adapted to project through one of said slots and coact with, on the outside of said post, slots of said beams, said key being preassembled with said post before said horizontal beams are assembled therewith, the improvement which comprises: said hook portion having a lower side with a downwardly opening notch adjacent said edge, said notch having a base with a width slightly less than the thickness of said sheet material and a side slightly diverging from said edge, whereby said key can be easily secured to said post by the walls of said notch while said post is in a disassembled horizontal postion.

2. The key of claim 1 wherein there are two hook portions extending from said edge spaced apart distances the same as said slots and both hook portions have downwardly facing notches adjacent said edge.

3. The key of claim 2 wherein said notch(es) has a maximum width of approximately 0.125 inches converging to a minimum width of approximately 0.090 inches.

4. In a key for use with a knock-down shelving unit which unit is comprised of: a hollow vertical post of sheet metal material of generally rectangular cross-section and having at least a pair of vertically spaced, vertically extending slots along its length and horizontal beams having end plates with similarly spaced and extending slots to be assembled with the post; said key including an elongated shank having an edge of a length greater than the length of one of said slots and adapted to abut against a wall of said post, said key additionally having an upwardly opening hook portion extending from said edge and adapted to project through one of said slots, the improvement which comprises: said hook portion having a lower side with a downwardly opening notch adjacent said edge, said notch having a base with a width slightly less than the thickness of said sheet material and a side diverging downwardly from said edge.

5. The improvement of claim 1 wherein said lower side slopes outwardly and downwardly from said notch.

6. The key of claim 2 wherein the lower side of each portion slopes outward and downwardly from the respective notch.

* * * * *